United States Patent
Kruger et al.

(10) Patent No.: US 11,530,232 B2
(45) Date of Patent: Dec. 20, 2022

(54) REVERSIBLY SOLUBLE BASES FOR LIGNIN OXIDATIVE DEPOLYMERIZATION

(71) Applicant: Alliance for Sustainable Energy, LLC, Golden, CO (US)

(72) Inventors: Jacob S. Kruger, Arvada, CO (US); Gregg Tyler Beckham, Golden, CO (US); David Gregory Brandner, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 17/099,725

(22) Filed: Nov. 16, 2020

(65) Prior Publication Data

US 2021/0147460 A1    May 20, 2021

Related U.S. Application Data

(60) Provisional application No. 62/935,145, filed on Nov. 14, 2019.

(51) Int. Cl.
  *C07G 1/00*    (2011.01)
(52) U.S. Cl.
  CPC ..................... *C07G 1/00* (2013.01)
(58) Field of Classification Search
  CPC ........................................................ C07G 1/00
  See application file for complete search history.

(56) References Cited

U.S. PATENT DOCUMENTS

| | | | | |
|---|---|---|---|---|
| 2,576,752 A | | 11/1951 | Fisher et al. | |
| 3,054,825 A | | 9/1962 | Craig et al. | |
| 3,653,829 A | * | 4/1972 | Gelblum | C01B 17/164 423/563 |
| 4,075,248 A | * | 2/1978 | Marshall | C07C 45/78 568/438 |
| 4,115,219 A | * | 9/1978 | Gancy | C01F 11/181 423/198 |
| 4,384,997 A | * | 5/1983 | Detroit | C09K 8/584 507/938 |
| 4,421,729 A | * | 12/1983 | Chiang | C01F 11/38 423/430 |
| 4,495,160 A | * | 1/1985 | Moote | C01F 11/462 423/166 |
| 5,549,789 A | * | 8/1996 | Atalla | D21C 9/1057 530/506 |
| 6,479,029 B1 | * | 11/2002 | Mingels | C01F 11/188 423/432 |
| 2006/0122274 A1 | * | 6/2006 | Hansen | A61P 3/14 562/563 |
| 2012/0318170 A1 | * | 12/2012 | Moffett | C04B 26/30 523/466 |
| 2013/0232853 A1 | * | 9/2013 | Peterson | C07G 1/00 568/426 |
| 2013/0313199 A1 | * | 11/2013 | Marcin | C02F 9/00 210/182 |
| 2015/0238948 A1 | * | 8/2015 | Geremia | B01J 31/0295 521/37 |
| 2015/0306564 A1 | * | 10/2015 | Kwon | B01D 53/02 252/190 |
| 2015/0337008 A1 | * | 11/2015 | Montagner | C08L 89/04 530/353 |
| 2016/0052949 A1 | * | 2/2016 | Beckham | B01J 37/0201 568/322 |
| 2016/0167977 A1 | * | 6/2016 | Maurer | C01F 11/181 423/432 |
| 2018/0370071 A1 | * | 12/2018 | Boitouzet | C08B 1/003 |

OTHER PUBLICATIONS

42nd Symposium on Biomaterials, Fuels and Chemicals, Apr. 25, 2020 (conference canceled), available at https://docs.google.com/viewer?url=https://sim.confex.com/sim/f/Abstracts2020SBFC, accessed on May 3, 2021, pp. 1-45.
ICOSSE '20—International Congress on Sustainability Science & Engineering virtual conference, Technical Program, Aug. 3-5, 2020, pp. 1-66.
2nd Bioenergy Sustainability Conference, Oct. 13-15, 2020, Virtual Conference, Technical Program, available at https://www.aiche.org/ifs/conferences/bioenergy-sustainability-conference/2020/technical-program, accessed May 3, 2021, pp. 1-6.
Kalliola et al., "Alkali-O2 oxidized lignin—A bio-based concrete plasticizer", Industrial Crops and Products, 2015, vol. 74, pp. 150-157.
Kruger et al., "Oxidation of Lignin-Rich Residue from Deacetylation, Mechanical Refining, and Enzymatic Hydrolysis of Lignocellulose", 2019 AIChE Annual Meeting, Orlando, Florida, Nov. 14, 2019, Abstract, available at https://aiche.confex.com/aiche/2019/meetingapp.cgi/Paper/573878, accessed Apr. 28, 2021, pp. 1-3.
Kruger et al., "455e Alkaline Oxidation of Lignin Using Reversibly-Soluble Bases", 2020 AiChe Annual Meeting, Abstract, available at https://plan.core-apps.com/aiche2020/event/283ce3bcb18028bc8c82272abb503857, accessed May 3, 2021, p. 1.
Kruger et al., "90—Alkaline Oxidation of Lignin Using Reversibly-Soluble Bases", Symposium on Biomaterials, Fuels and Chemicals (SBFC), Apr. 26-28, 2021 (virtual conference), abstract available at https://sim.confex.com/sim/sbfc2021/meetingapp.cgi/Paper/43418, accessed on May 3, 2021, pp. 1-3.
Mota et al., "Recovery of Vanillin and Syringaldehyde from Lignin Oxidation: A Review of Separation and Purification Processes", Separation & Purification Reviews, 2016, vol. 45, No. 3, pp. 227-259.
Schutyser et al., "Revisiting alkaline aerobic lignin oxidation", Green Chemistry, 2018, vol. 20, pp. 3828-3844.
Schutyser et al., "Chemicals from lignin: an interplay of lignocellulose fractionation, depolymerisation, and upgrading", Chemical Society Reviews, 2018, vol. 47, pp. 852-908.

* cited by examiner

*Primary Examiner* — Liam J Heincer
(74) *Attorney, Agent, or Firm* — Sam J. Barkley

(57) ABSTRACT

Disclosed herein are lignin valorization strategies that integrate thermochemical pretreatment strategies. Using methods disclosed herein, yields of greater than 40% of usable monomers are obtained from lignin in biomass. The monomers can be assimilated by strains of *Pseudomonas putida*.

12 Claims, 9 Drawing Sheets

REVERSIBLY SOLUBLE BASES FOR LIGNIN OXIDATIVE DEPOLYMERIZATION

CROSS-REFERENCE TO RELATED APPLICATIONS

This application claims priority under 35 U.S.C. § 119 to U.S. Provisional Patent Application No. 62/935,145 filed on 14 Nov. 2019, the contents of which are hereby incorporated in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Lignin valorization is critical to biorefinery economics, with current techno-economic analysis (TEA) models indicating that 40-100% of the lignin must be converted into valuable coproducts to produce hydrocarbon fuels at three dollars per gasoline gallon equivalent (GGE).

Lignin depolymerization to produce aromatic monomers has been pursued for decades, but monomer yields are typically low for isolated lignins. Alkaline oxidation is capable of producing high yields of monomers (especially high value monomers, such as vanillin) from isolated lignins, but only with very high base concentrations (e.g, 2 M NaOH). Additionally, the post-reaction solutions must be brought to pH of less than 7 to allow extraction of phenolic monomers. When using NaOH or KOH as bases, this means neutralizing the base and continually buying more, or recycling all of the base through a lime cycle regeneration operation similar to a Kraft paper mill. The cost of the alkali and/or regeneration then outweighs the value of the monomeric product, even for products like vanillin at greater than $10/kg.

There are two markets worth considering: lignin depolymerization and aromatic aldehyde production.

For lignin depolymerization, leading technologies include reductive catalytic fractionation (RCF), base-catalyzed depolymerization (BCD), acidolysis, high temperature alcoholysis, oxidation-solvolysis, and alkaline oxidation. RCF and BCD work substantially better on native lignin than isolated lignin (thus are less flexible than alkaline oxidation) and don't directly generate high-value monomeric species, such as phenolic aldehydes. Both of these also generate fewer monomeric products than alkaline oxidation and monomer yield is maximized at longer time scales. Acidolysis, using acids to cleave ether and ester bonds at temperatures of 120-200° C., also suffers from these issues. High-temp alcoholysis generates aromatic monomers in high yield (sometimes exceeding 100% of lignin mass due to incorporation of the alcohol into the product), but as a complex product mixture of mainly alkyl benzenes and alkyl phenols. These mixtures are too toxic for biological conversion, and the extensive alkylation makes them difficult to separate for any use other than fuel. Oxidation-solvolysis (e.g., TEMPO oxidation-formic acid solvolysis) generates monomers in high yield, though at longer time scales than even RCF, and the suitability of these monomers for downstream applications (through biological or chemical upgrading) is unknown.

For aromatic aldehyde production, vanillin is the product with highest demand and market size, though aromatic aldehydes in general could be more widely used in many applications (chemical precursors for pharmaceutical applications, corrosion inhibitors, and others) if they could be more readily produced. Borregaard is the only commercial producer of vanillin from lignin, but their technology is closely tied to sulfite pulping, which uses hazardous and environmentally harmful $SO_2$. Traditionally, alkaline oxidation (and BCD) have used NaOH, which limits the recyclability of the base. Other than vanillin extracted from vanilla beans or produced by Borregaard, which cumulatively account for about 10% of worldwide production, vanillin is synthesized from petrochemical-derived phenol in a several step process. Thus, new routes are needed to economically produce aromatic aldehydes from renewable resources, which alkaline oxidation with reversibly-soluble bases may be able to do.

Lignin is an aromatic heteropolymer comprising generally 15 to 30 percent of lignocellulosic biomass. The lignin chemical structure is substantially different than that of polysaccharides, suggesting that valorization strategies for these two fractions of biomass may benefit from a fractionation step to separate lignin from cellulose and hemicellulose, such that upgrading strategies may be tailored to the chemistry of each fraction. Several pretreatment technologies have been developed to fractionate lignin and carbohydrates, including acidic, basic, enzyme, and solvent-based approached. Among these, a combined approach of mildly-alkaline deacetylation, followed by mechanical refining and enzymatic hydrolysis, is especially promising. This approach has been demonstrated to achieve high yields of water-soluble monosaccharides while preserving lignin, which is partially solubilized in the deacetylation step and partially recovered as an insoluble residue after enzymatic hydrolysis, in a near-native state. Native lignin (the form in which it is present in the whole biomass) is generally the most reactive state, and most amenable to depolymerization, which is the first step in many lignin valorization concepts.

Most lignin depolymerization approaches have demonstrated monomer yields well under 40%, especially when constrained to produce monomers that are amenable to biological upgrading. The challenge in obtaining high monomer yields is multifold, but is largely due to the heterogeneity of linkages present in a typical lignin stream and the reactivity of produced monomers to undergo unfavorable secondary reactions, such as decarboxylation, ring-opening and repolymerization to recalcitrant structures. That is, lignin phenylpropanoid monomers are linked by ester, ether, and carbon-carbon bonds of varying strength. The weakest linkages (especially ester and β-O-4 ether linkages) cleave first, producing an initial pool of monomers. The reaction conditions required to break the stronger linkages often lead to the degradation of monomers released from the weaker linkages.

SUMMARY

In an aspect, disclosed herein is a method for the depolymerization of lignin wherein the lignin is treated with alkali $Sr(OH)_2$. In an embodiment, the $Sr(OH)_2$ is recovered after treatment of the lignin. In an embodiment, the depolymerization of lignin yields monomers up to 48% of the weight percent of the lignin. In an embodiment, the recovery of $Sr(OH)_2$ includes the step of cooling an alkaline oxidizing solution of lignin depolymerization products. In an embodiment, the method further comprises filtering the $Sr(OH)_2$ from the cooled alkaline oxidizing solution of lignin depolymerization products. In an embodiment, the method further comprises the step of reacting the resulting filtrate with carbon dioxide and then extracting the products of the reaction between the filtrate and carbon dioxide with an organic solvent. In an embodiment, the method further comprises the step of filtering the resulting solution and isolating the strontium carbonate. In an embodiment, the method further comprises the step of calcining the strontium carbonate to strontium oxide. In an embodiment, the method further comprises the step of reacting the strontium oxide and with water to produce $Sr(OH)_2$. In an embodiment, the method further comprises the step of isolating $Sr(OH)_2$. In an embodiment, the amount of strontium isolated is greater than 90 weight percent of the amount of strontium used in the alkali treatment method for the depolymerization of lignin.

In an aspect, disclosed herein is a method for the depolymerization of lignin wherein the lignin is treated with alkali $Ba(OH)_2$. In an embodiment, the $Ba(OH)_2$ is recovered after treatment of the lignin. In an embodiment, the recovery of $Ba(OH)_2$ includes the step of cooling an alkaline oxidizing solution of lignin depolymerization products. In an embodiment, the method further comprises filtering the $Ba(OH)_2$ from the cooled alkaline oxidizing solution of lignin depolymerization products. In an embodiment, the method further comprises the step of reacting the resulting filtrate with carbon dioxide and then extracting the products of the reaction between the filtrate and carbon dioxide with an organic solvent. In an embodiment, the method further comprises the step of filtering the resulting solution and isolating the barium carbonate. In an embodiment, the method further comprises the step of calcining the barium carbonate to barium oxide. In an embodiment, the method further comprises the step of reacting the barium oxide and with water to produce $Ba(OH)_2$. In an embodiment, the method further comprises the step of isolating $Ba(OH)_2$.

Other objects, advantages, and novel features of the present invention will become apparent from the following detailed description of the invention when considered in conjunction with the accompanying drawings.

DETAILED DESCRIPTION

Figures 1A, 1B:
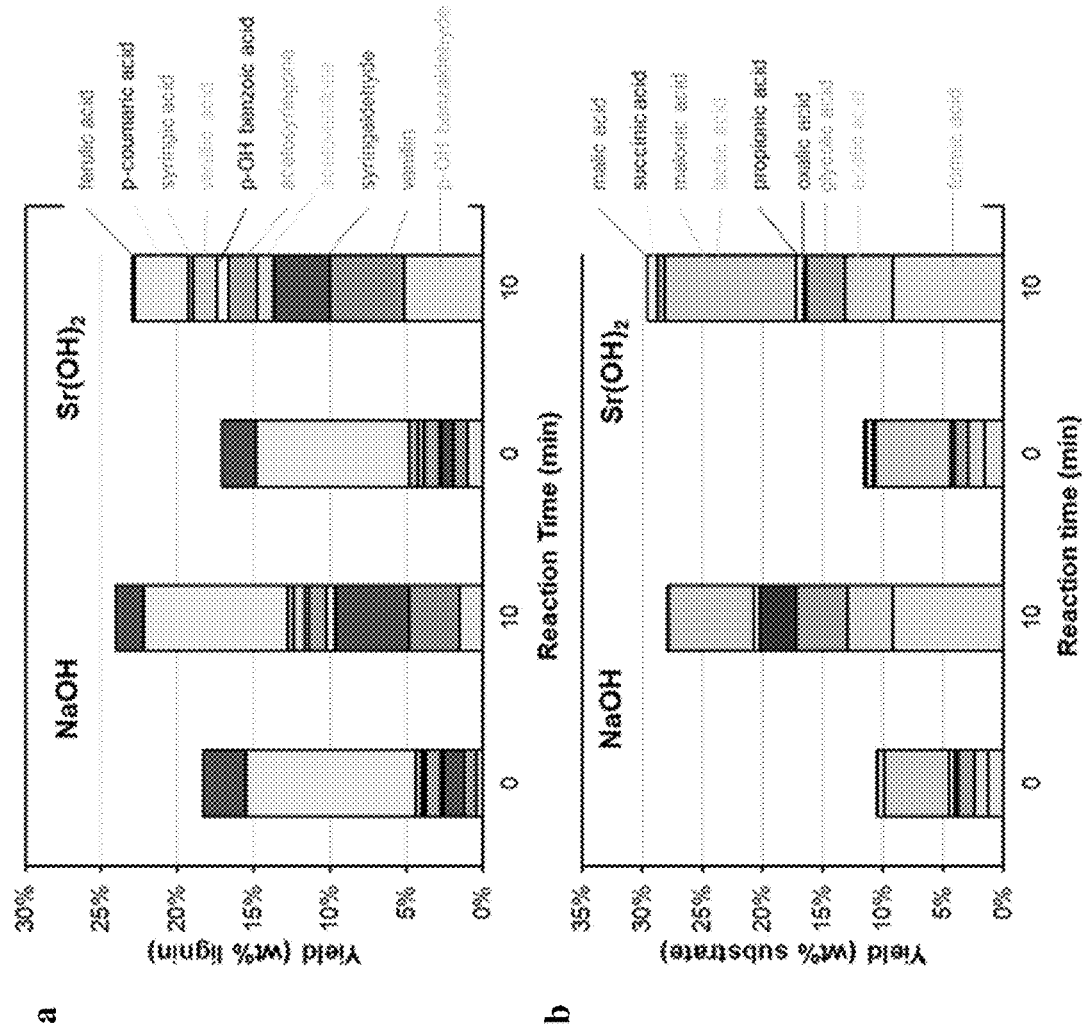
FIG. 1a depicts a comparison of the yield of various compounds according to the weight percent of lignin using NaOH and $Sr(OH)_2$ as alkali source in BCD (0 min) and alkaline oxidation (10 min) conditions.
FIG. 1b depicts a comparison of the yield of various compounds according to the weight percent of substrate using NaOH and $Sr(OH)_2$ as alkali source in BCD (0 min) and alkaline oxidation (10 min) conditions.

In an embodiment, disclosed herein are separation steps to maximize monomer yields from treated lignin. In an embodiment, the steps have been selected to first selectively release ester-linked monomers, then release β-O-4-linked monomers, and finally release C—C linked monomers.

$Mg(OH)_2$ and $Ca(OH)_2$ are relatively insoluble at room temperature and decrease in solubility with increasing temperature, $Sr(OH)_2$ and $Ba(OH)_2$ show an opposite trend. They are slightly more soluble at room temperature, but their solubility increases dramatically as temperature increases. $Ba(OH)_2$ becomes soluble to roughly 2 M at 80° C. while $Sr(OH)_2$ becomes soluble to roughly 2 M at 95° C. Due to these trends, it is feasible to obtain the high hydroxide ion concentrations needed for high monomer yields in the alkaline oxidation of lignin at typical reaction temperatures while maintaining the benefits of a mostly insoluble hydroxide source at room temperature. In this way, it is possible to recover the excess base by filtration. Furthermore, the small amount of residual base in solution is amenable to neutralization with $CO_2$, precipitating $SrCO_3$ or $BaCO_3$ that can also be filtered and regenerated to the hydroxide, and thus leave a neutral-pH, low-salt monomer solution that would is amenable to either direct monomer extraction or biological upgrading.

In an embodiment, disclosed herein are methods of using $Ba(OH)_2$ and $Sr(OH)_2$ as reversibly-soluble bases for alkaline oxidation of lignin, including a direct comparison to NaOH, recovery and regeneration of the hydroxide materials, and biological upgrading of the monomer solution.

Disclosed herein are methods to produce up to about 40% monomer yields from lignin in corn stover biomass, and biological assimilation of those monomers in a muconic acid-producing organism. In an embodiment, muconic acid can be upgraded to high-value polymers by performing small-scale lignin depolymerization experiments to determine preferable reaction conditions, duplicating those conditions for several replicates to produce sufficient material for biological upgrading, and cultivating P. putida KT2440 on post-reaction solutions to assimilate lignin carbon.

Treating native or technical lignin under alkaline oxidizing conditions generates a stream of aromatic monomers that can be upgraded to fuels or separated and sold as coproducts.

As disclosed herein, using $Sr(OH)_2$ or $Ba(OH)_2$ as reversibly soluble bases allows simple recycle of excess alkali that is not possible with fully soluble bases (e.g., NaOH, KOH) or bases with low solubility at all temperatures (e.g., $Mg(OH)_2$, $Ca(OH)_2$). The recycle is enabled by cooling the post reaction to room temperature and filtering most of the $Sr(OH)_2$ or $Ba(OH)_2$ out, then contacting the filtrate with $CO_2$ to convert soluble Sr and Ba to insoluble carbonate while neutralizing/acidifying the solution. The solution is then extracted with an organic solvent and filtered again to recover the carbonate, which can be recycled to the hydroxide by calcining to the oxide and contacting with water.

Methods

Corn stover and lignin fractions were obtained by known means. The pretreatment DMR-EH resulted in two lignin fractions: lignin solubilized in the deacetylation black liquor and the lignin-rich residue recovered after the DMR-EH process. The deacetylation black liquor was freeze-dried and used directly as black liquor solids. The post-EH residue (referred to herein as DMR lignin) was obtained from the post EH slurry by centrifuging the whole slurry, repeatedly washing the insoluble fraction with water, and re-centrifuging. Compositional analysis of the three fractions is shown in Table 1.

TABLE 1

Compositional analysis of whole corn stover and the lignin fractions isolated during DMR-EH treatment.

| Fraction | % Total Ash | % Total Protein | % Lignin | % Glucan | % Xylan | % Galactan | % Arabinan | % Acetyl | Total % |
|---|---|---|---|---|---|---|---|---|---|
| Whole Corn Stover | 6.97 | 2.67 | 18.16 | 36.23 | 21.34 | 1.61 | 3.25 | 2.15 | 98.26 |
| DMR Lignin | 13.20 | 6.80 | 46.00 | 22.50 | 8.50 | 1.30 | 1.80 | | 100.10 |
| Black Liquor Solids | 29.41 | 4.25 | 33.63 | 3.62 | 10.24 | 2.09 | 4.29 | 4.49 | 92.01 |

Lignin Oxidation

In a typical reaction, lignin or biomass, solid base, and deionized water were added to a 75 mL Parr reactor, along with a stir bar. The reactor was sealed, purged with He, and checked for leaks, then heated to the desired reaction temperature. When at temperature, zero air was added to generate a total pressure of 30 bar. Before adding air, the pressure inside the reactor was roughly 8 bar, indicating that the air partial pressure was roughly 22 bar. After the desired oxidation time, the reactor was quenched in room temperature water.

Reactor Workup

When cool, reactors were depressurized, opened and the contents emptied into a ChemRus 60 mL filter funnel, and vacuum filtered to recover residual biomass and metal hydroxide. The solid cake was dried in air and reserved for analysis, while the liquid filtrate and stir bar were then returned to the Parr reactor. The reactor was again sealed and checked for leaks, and then pressurized with 35 bar $CO_2$ and stirred for 10 min at room temperature to neutralize the residual solution. The reactor was then vented and opened, the contents were emptied into a separate ChemRus 60 mL filter funnel, and vacuum filtered to recover precipitated carbonate.

Sample Analysis

The neutralized filtrates were then analyzed by HPLC using two methods. The first method quantified aromatic monomers using HPLC-MS with an Agilent Triple Quadrupole mass analyzer. The second method analyzed for aliphatic acids using HPLC-RID with an Agilent HPLC and an BioRad 87H column.

Recovery yields of the $Sr(OH)_2$ were determined on an anhydrous basis by drying the recovered $Sr(OH)_2$ in a vacuum oven at 40° for at least 2 h. It was determined that octahydrate partially converted to the monohydrate and anhydrous form during vacuum filtering operations, and thus full conversion to the anhydrous form provided the most reliable measure of hydroxide recovery.

Depolymerization experiments were carried out in a Parr 5000 MRS. Typically, 0.3 g of lignin or 1 g of biomass, 7.973 g $Sr(OH)_2$ (corresponding to roughly 2 M hydroxide concentration), and 30 mL of water, along with a stir bar, were loaded into a 75 mL Parr reactor and sealed. The reactor was purged with helium, leak checked, vented, and closed before heating (i.e., initial pressure was 1 bar He). The reactor was then heated to 175° C., which typically presented a total pressure around 8 bar. If desired, zero air was added to bring the total pressure to 30 bar, the reactor was maintained at 175° C. for the desired amount of time, and then quenched in cool water. After cooling, residual solids and $Sr(OH)_2$ were filtered out, the liquid filtrate was returned to the Parr reactor along with a stir bar, and sealed. The reactor was again leak checked, then pressurized with 10 bar $CO_2$ and stirred at room temperature for 10 min to neutralize residual Sr, which precipitated as $SrCO_3$. This neutralized solution was filtered and the liquid filtrate was preserved for biological upgrading. The pH of the neutralized solution was roughly 7.5. The substrate used in the biological upgrading was produced from five identical reactors containing DMR lignin, reacted at 175° C. with 2M $Sr(OH)_2$ under 30 bar total (about 22 bar air) for 10 min. These reaction products were combined after confirming similar monomer concentrations in each.

The native bacterium Pseudomonas putida KT2440 was revived from glycerol stocks in LB medium at 30° C., 225 rpm for 16 h. Cells were washed, resuspended in minimal media M9 and inoculated in filter-sterilized lignin media (pH 7) at an initial optical density at 600 nm of 0.2. The lignin liquor (90%) was supplemented with modified x10 M9 salts containing per L (final concentration): 6.78 g, $Na_2HPO_4$, 3 g $H_2PO_4$, 2 g $(NH_4)_2SO_4$, and 0.5 g NaCl. Then, 2 mL of 1 M $MgSO_4$, 100 µL of 1 M $CaCl_2$, and 1 mL of $FeSO_4$ were added. The cultures were performed in triplicate in 125 mL shake flasks containing 25 mL of culture medium and incubated at 30° C. and 225 rpm. Non-inoculated samples (control) were incubated and treated under the same conditions than the bacterial treatments.

Results

Figure 7:
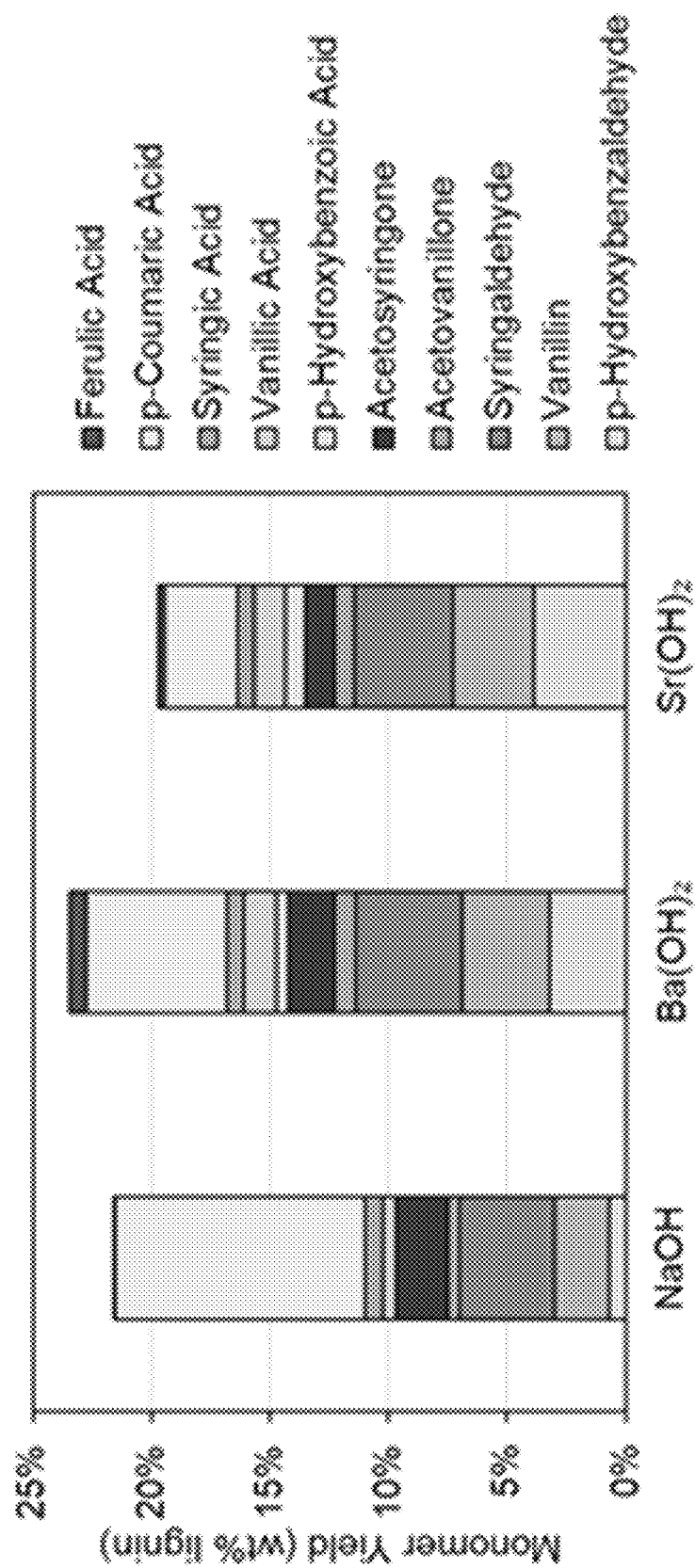
FIG. 7 depicts a comparison of aromatic monomer yields from alkaline oxidation of DMR-EH lignin. Reaction conditions: 10 g/L lignin, 2 M OH, 5 bar $O_2$/15 bar He, 175° C., 10 min reaction time.

An initial screening demonstrated that $Ba(OH)_2$ and $Sr(OH)_2$ perform equivalently to NaOH in terms of total monomer yield during alkaline oxidation of native corn stover, deacetylation black liquor, and DMR-EH lignins, as shown in FIG. 7. Each base is able to generate 20-23 wt % monomer yield from the DMR-EH lignin.

There is a difference in selectivity between Na, Ba, and Sr hydroxides. NaOH generates a monomer stream with a higher proportion of p-coumaric acid and a lower proportion of aldehydes, while Ba(OH)$_2$ and Sr(OH)$_2$ each yielded less p-coumaric acid and more phenolic aldehydes. By using p-coumaric acid and ferulic acid as starting materials under similar conditions, we determined that Sr(OH)$_2$ is capable of converting the hydoxycinnamate to the corresponding aldehyde, possibly by promoting decarboxylation and concomitant generation of the insoluble SrCO$_3$. Decarboxylation would generate the corresponding vinylphenol, which is analogous to the enol ether intermediate proposed for aldehyde generation during cleavage of β-O-4' bonds in the lignin structure.

Thus, both Sr(OH)$_2$ and Ba(OH)$_2$ are to be effective and equivalent substitutes for NaOH in the alkaline oxidation of lignin. However, Sr(OH)$_2$ may be favorable to Ba(OH)$_2$ for several reasons. During neutralization, the solubility of SrCO$_3$ is lower than that of BaCO$_3$. While the difference is not likely to be significant in terms of total Sr or Ba recovery, Ba has a higher environmental toxicity and is thus more strictly regulated. In particular, the US EPA places a limit of 2 ppm Ba in drinking water, while Sr is not specifically regulated, but a limit of 4 ppm Sr in drinking is recommended. The solubility of BaCO$_3$ is roughly 7 ppm, well above the regulated safe drinking water limit, while the solubility of SrCO$_3$ is roughly 2.1 ppm, which is below the recommended safe drinking water limit. Additionally, the regeneration of SrCO$_3$ to SrO (which then reforms the hydroxide on addition of H$_2$O) occurs at a lower temperature than the regeneration of BaCO$_3$ to BaO, allowing for less energy consumption in the overall biorefinery. Similarly, Sr has a lower mass than Ba, and so also requires less energy to circulate around a biorefinery. Thus, in some embodiments, use of Sr(OH)$_2$ may be preferred.

Figure 8:
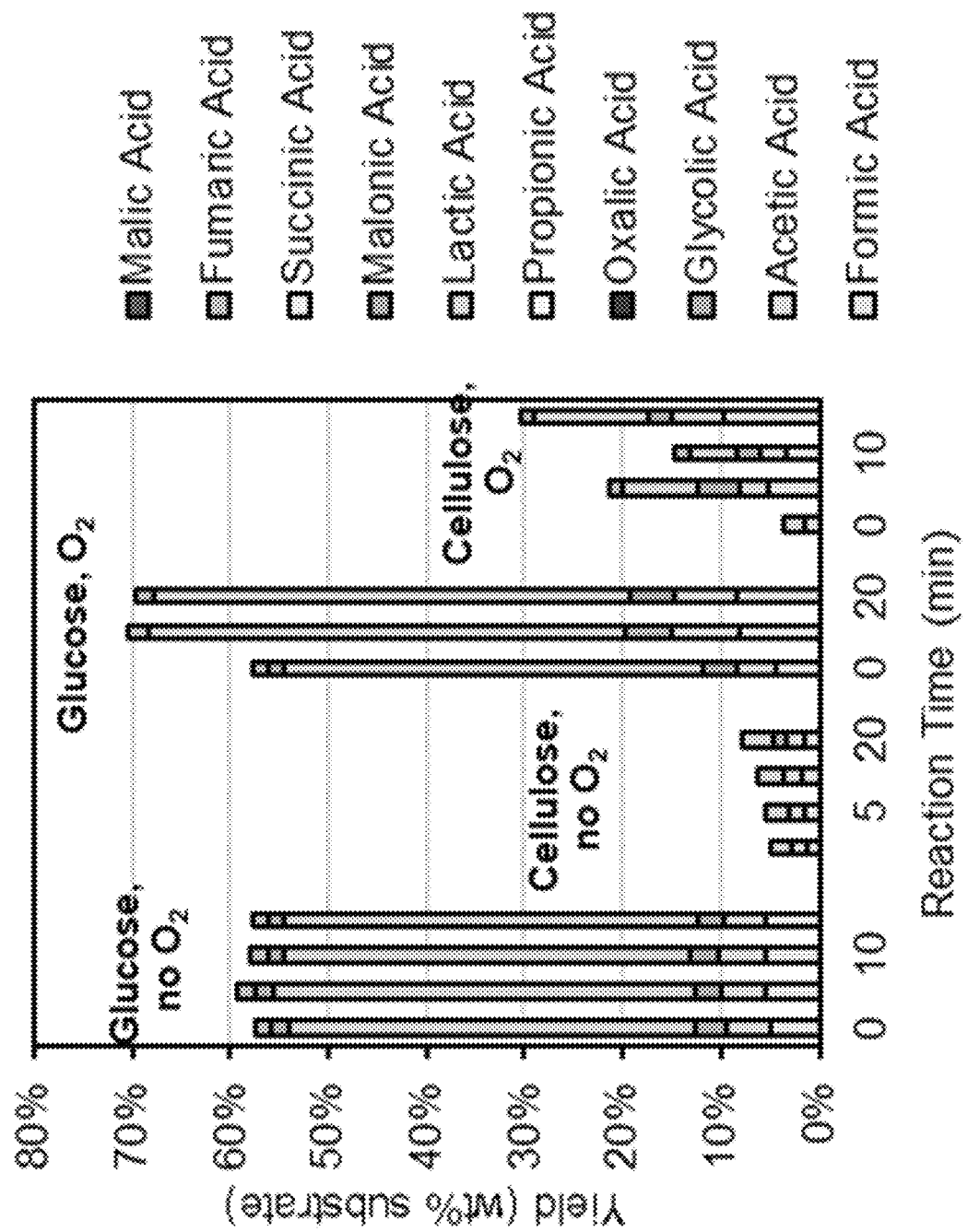
FIG. 8 depicts the yield versus reaction time of carbohydrates during alkaline oxidation using $Sr(OH)_2$ as reversibly soluble base. Reaction conditions: 10 g/L carbohydrate, 2 M $Sr(OH)_2$, 22 bar air, 175° C.

The DMR-EH residue (as well as the parent corn stover) contain significant carbohydrates. These carbohydrates are mainly cellulose in the present substrates, but monomeric glucose may also be present in the DMR-EH lignin. In an embodiment, carbohydrates under alkaline oxidation conditions in the presence of Sr(OH)$_2$ were tested using method disclosed herein. As shown in FIG. 8, glucose is largely degraded to lactic acid in both oxidative and nonoxidative conditions, while cellulose remains largely intact. The degradation of glucose to lactic acid likely occurs by retro-aldol reaction. Using methods and processes disclosed herein, the advantages of Sr(OH)$_2$ over NaOH for this reaction offer several advantages over glucose fermentation to lactic acid.

The reversibly-soluble bases methods and systems disclosed herein allow for the recovery and reuse of the base. After filtration of the excess base, neutralization of the filtrate using CO$_2$ is the next step. Using 35 bar CO$_2$, the neutralization reaction equilibrates within roughly 5 min, during which time the pH of the filtrate has dropped from pH 13 to pH 6. Under similar conditions, Ca(OH)$_2$ and Ba(OH)$_2$ also produce a solution of pH 6-6.5, while NaOH produces a solution of pH 3.5. This difference in pH range also has implications in the extraction of monomers and for biological upgrading. In particular, pH 6-7 is useful for selective monomer extraction, as it allows recovery of compounds with phenolic groups, which have pKa in the range of 7.5-9 and are not significantly ionized in this pH range, while leaving compounds with carboxylic acid groups, which have pKa in the range of 3-4.5 and are ionized, in the aqueous phase. Biological upgrading, which is occurs at pH 6-7, is also facilitated in this range.

In an embodiment, the presence of lignin products, the color of the solution also changes from golden yellow to clear during neutralization, likely indicating some precipitation of oligomeric lignin. However, monomers are not precipitated, and monomer yields remain at about 25% through the entire workup protocol.

Figure 9:
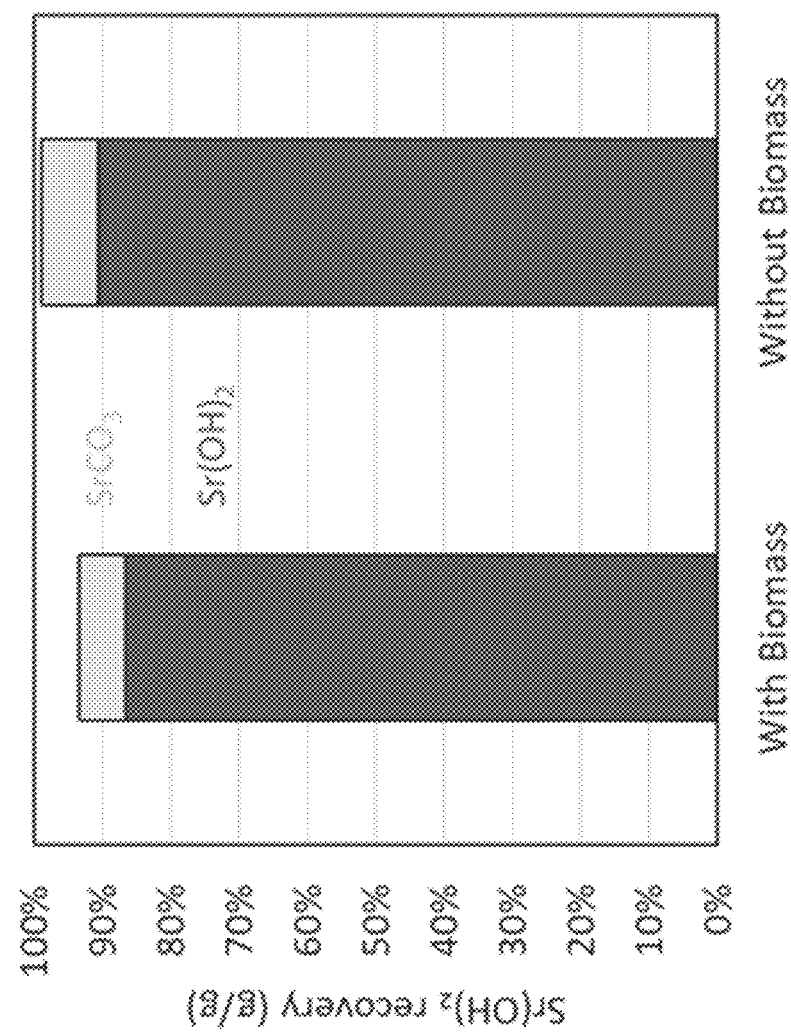
FIG. 9 depicts recovery of $Sr(OH)_2$ after heating to 175° C. with and without DMR-EH lignin, and recovery of $SrCO_3$ after neutralization of residual $Sr(OH)_2$ using $CO_2$.

In an embodiment, total Sr recovery exceeds 90% from depolymerized solutions and 99% in the absence of biomass, as shown in FIG. 9. The difference is likely due to the presence of Sr carboxylate salts, such as strontium acetate, which may limit the extent of SrCO$_3$ precipitation.

In an embodiment, the methods disclosed herein include the step of calcining the strontium carbonate and barium carbonate to strontium oxide and barium oxide, respectively.

Lignin Depolymerization

As a first step in lignin depolymerization, ester bonds were targeted with a nonoxidative base-catalyzed depolymerization (BCD), followed by an alkaline oxidation. Corn stover lignin may be comprised of up to 25% coumaric and ferulic acids, primarily ester-linked within the lignin structure, which esters are cleaved in alkaline conditions. While BCD typically employs NaOH as the alkali source in large excess up to 4 wt %, disclosed herein are methods that use Sr(OH)$_2$ and/or Ba(OH)$_2$ to also function as the alkali source due to their high solubility at reaction temperature. FIG. 1 depicts a comparison of NaOH and Sr(OH)$_2$ in alkaline depolymerization of a DMR lignin that is about four years old. Both bases generate greater than 20 wt % monomers from the lignin, mainly p-coumaric acid derivatives and phenolic aldehydes, as well as a range of aliphatic acids, which likely derive from both the lignin and the carbohydrate fractions of the DMR substrate.

An advantage that Sr(OH)$_2$ and Ba(OH)$_2$ have over NaOH is that Sr(OH)$_2$ and Ba(OH)$_2$ are much less soluble at room temperature such that the excess base can be filtered out and recycled after reaction. This feature reduces overall costs of lignin depolymerization, but also reduces salt stress in subsequent biological upgrading of the monomers. Additionally, the solution can be neutralized with CO$_2$, which precipitates Sr and Ba as insoluble carbonates, further reducing the salt stress in the subsequent fermentation. Sr is preferable to Ba as the carbonate is less soluble and Sr is less toxic than Ba. Thus, in an embodiment, Sr(OH)$_2$ was preferentially used as the alkali source in the experiments disclosed herein.

Figures 2A, 2B:
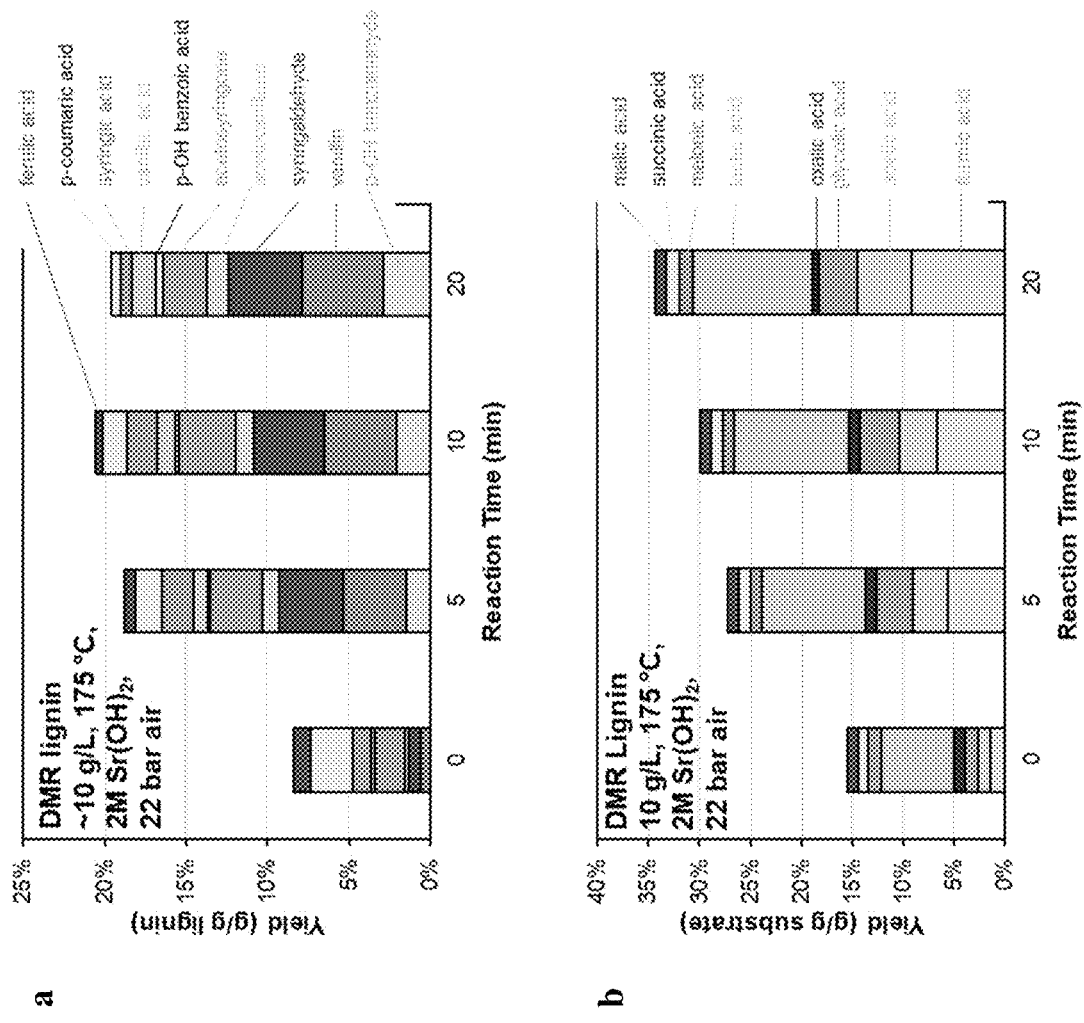
FIG. 2a depicts phenolic monomer and aliphatic acid yields in terms of g/g of lignin from deacetylation, mechanical refining (DMR) lignin.
FIG. 2b depicts phenolic monomer and aliphatic acid yields in terms of g/g of substrate from DMR lignin.

FIG. 2 depicts monomer yields as a function of time for the present DMR substrate. The trend is again the initial liberation of coumaric acids prior to addition of oxygen (as air), followed by release of additional monomers, likely from β-O-4 cleavage. Monomer yields peak at 10 min, after which the monomer degradation reactions outpace the monomer generation reactions. The aliphatic acids continue to increase in yield, as they are, in part, products of monomer oxidative degradation. As 10 min provided the maximum monomer yield, this condition was used as the baseline for the remaining experiments, and to produce media for biological upgrading, containing roughly 0.4 g/L mixed aromatic monomers and 2.0 g/L mixed aliphatic acids. The relatively low yield to coumaric acids (2.6 wt % yield to coumaric; 1.0 wt % yield to ferulic) is likely a function of different pretreatment conditions and a different corn stover parent material, which may have had a lower coumarate content. However, higher concentrations of coumarates are present in the black liquor.

Figures 3A, 3B:
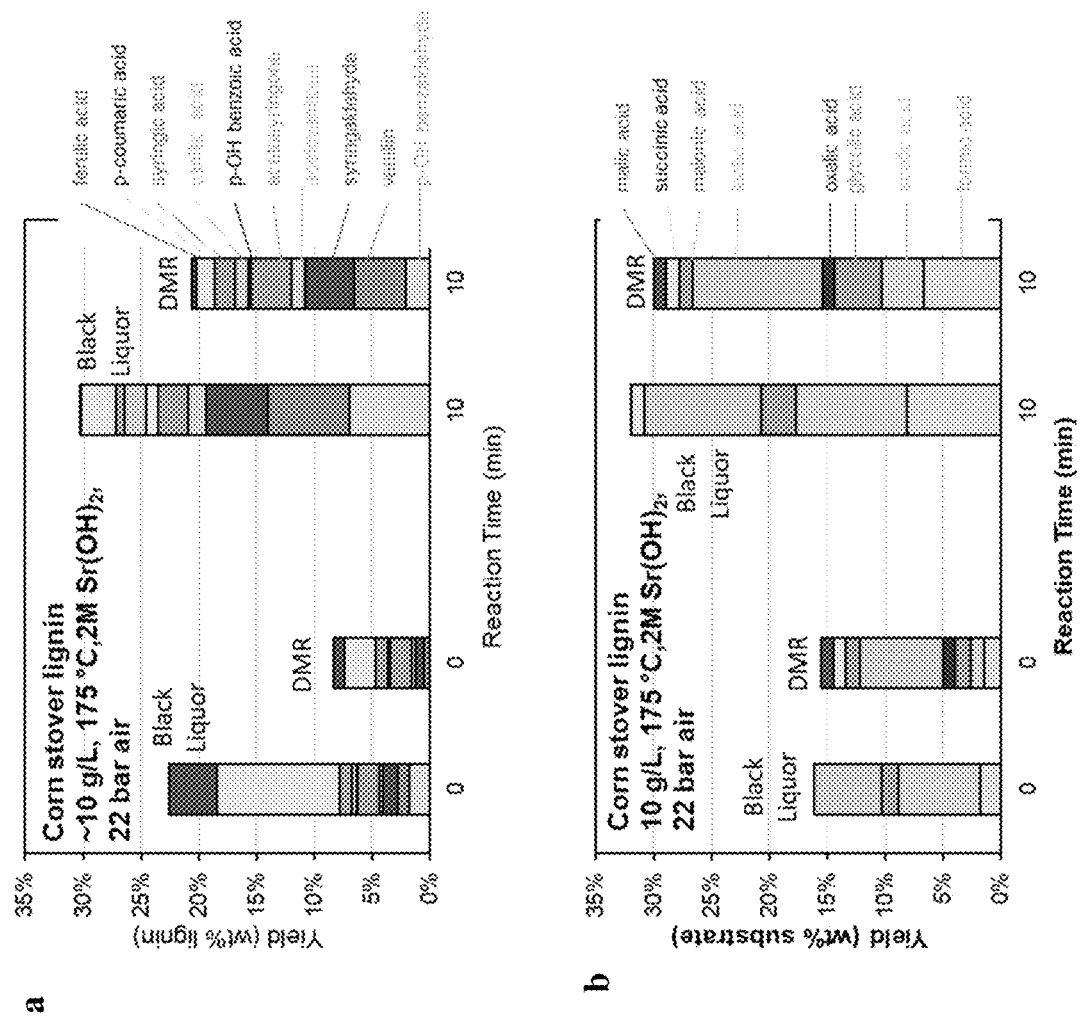
FIG. 3a depicts phenolic monomer and aliphatic acid yields in terms of weight percent lignin from corn stover lignin fractionated in the deacetylation, mechanical refining, and enzymatic hydrolysis (DMR-EH) process.
FIG. 3b depicts phenolic monomer and aliphatic acid yields in terms of weight percent substrate from corn stover lignin fractionated in the DMR-EH process.

FIG. 3 depicts a comparison DMR lignin and the black liquor solids at 0 min (BCD, before adding oxygen) and after 10 min of alkaline oxidation (peak monomer yields). The black liquor produces a 10.5% yield to p-coumaric acid and a 4.2% yield to ferulic acid.

The parent corn stover has a monomer yield between the black liquor and DMR lignins. Thus, it appears that the DMR-EH process fractionates the native lignin into a more-reactive portion in the deacetylation black liquor, and a less-reactive portion in the post-EH residue. The fractionation is not likely uniform, with the most reactive linkages (i.e., esters) liberated primarily in the deacetylation step. Thus, the yield of coumaric acids from the black liquor lignin is more representative of that from the whole lignin.

The coumaric acids degrade rapidly in the oxidizing conditions. In the black liquor, coumaric acid and ferulic acid are 72% and 96% degraded, respectively. In the DMR lignin, they are 43% and 54% degraded, respectively. Without being limited by theory, the reason for the difference between the two fractions may be due to the presence of more non-lignin oxidizable materials in the DMR substrate. The degradation of coumaric acids is an example of the need to separate these monomers prior to adding oxygen to the reactor.

Figures 4A, 4B:
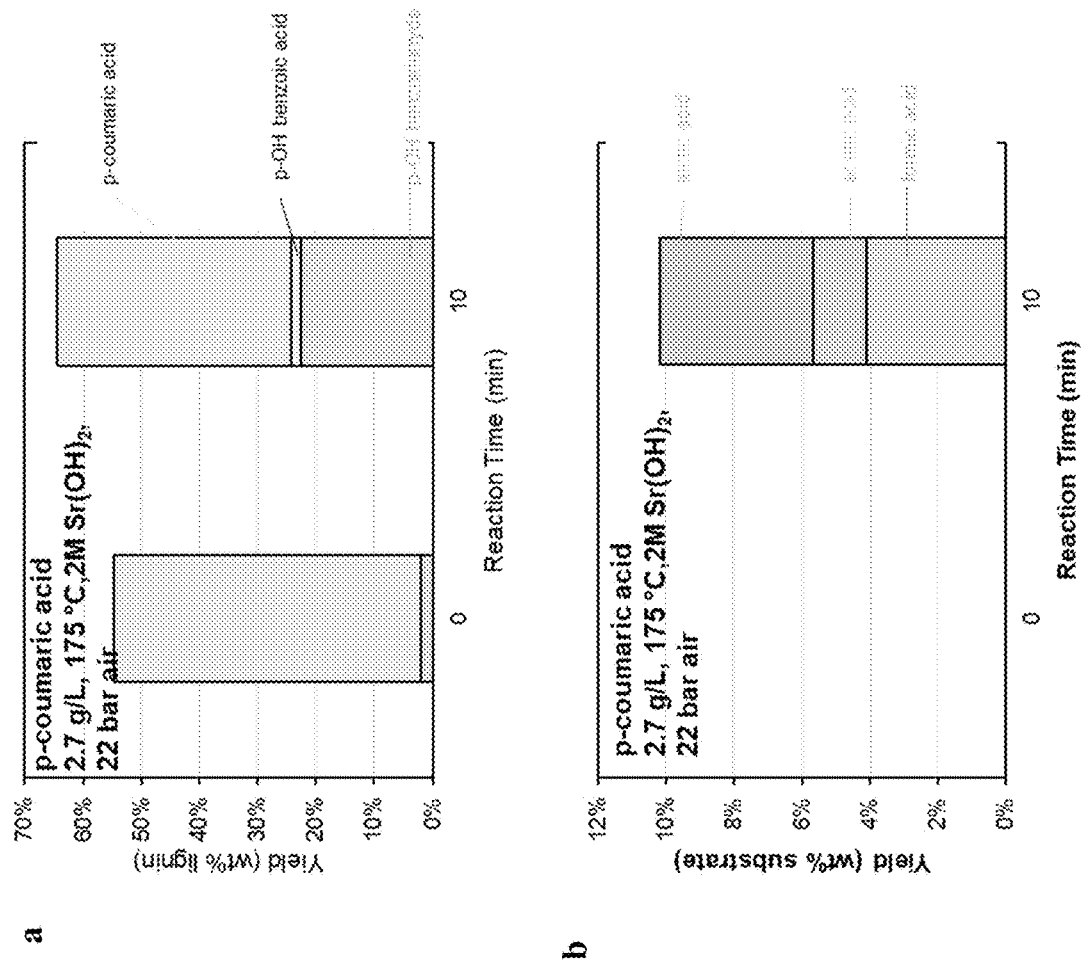
FIG. 4a and depicts coumaric acid degradation in terms of yield measured by weight percent lignin under $Sr(OH)_2$ base-catalyzed depolymerization (BCD) at (0 min) and alkaline oxidation (10 min) conditions.
FIG. 4b and depicts coumaric acid degradation in terms of yield measured by weight percent substrate under $Sr(OH)_2$ base-catalyzed depolymerization (BCD) at (0 min) and alkaline oxidation (10 min) conditions.

Without being limited by theory, the achievable yield of coumaric acids may be even higher than depicted herein, as, in an embodiment, the black liquor contains free coumaric acid prior to freeze drying. When the black liquor solids were reconstituted, the free coumaric acid was likely re-dissolved into solution. However, these acids likely degraded to a significant extent even during reactor heat up. A separate experiment with coumaric acid as the starting material showed that nearly 50% of the coumaric acid was degraded to unknown compounds and a small amount of p-OH benzaldehyde during reactor heating to 175° C., as shown in FIG. 4. Ten minutes of oxidation converted some of the coumaric acid and the unknown compounds into p-OH benzaldehyde and p-OH benzoic acid (cumulatively 24 wt % yield), along with formic, acetic, and lactic acids (cumulatively 10 wt % yield). Thus, the combined 14.7 wt % yield observed from the black liquor above is a conservative estimate of the total coumaric acids yield from the present lignin streams.

In an embodiment, a separation step to isolate the coumaric acids prior to oxidation was not performed. Thus, 25% of the degraded coumaric between the 0 and 10 min time points could have been converted into other detected monomers. Thus, a maximum of 2.9 wt % monomers at the 10 min time point for black liquor and 0.4 wt % from the DMR lignin, could have come from coumaric acids that would have been removed prior to oxidation in the proposed process. Thus, in an embodiment, the corrected maximum oxidative monomer yields from the black liquor and DMR lignins, respectively, are 27.4% and 20.2%.

During a pilot plant run, it was not feasible to precisely track mass balances of the lignin liberated in the deacetylation black liquor and retained in the post-EH material. Thus, it is challenging to calculate a precise total oxidation monomer yield for the total lignin in the parent corn stover. However, as mentioned above, the parent corn stover produced a monomer yield between those of the black liquor and the DMR lignin. A weighted average, assuming no degradation in the DMR-EH process, would indicate that 38.1% of the lignin was liberated in the deacetylation black liquor (likely enriched in coumaric acids), while 61.9% was retained in the DMR lignin. Using these numbers in combination with the corrections above results in an oxidative monomer yield of 22.9% for the overall lignin stream.

Figure 5:
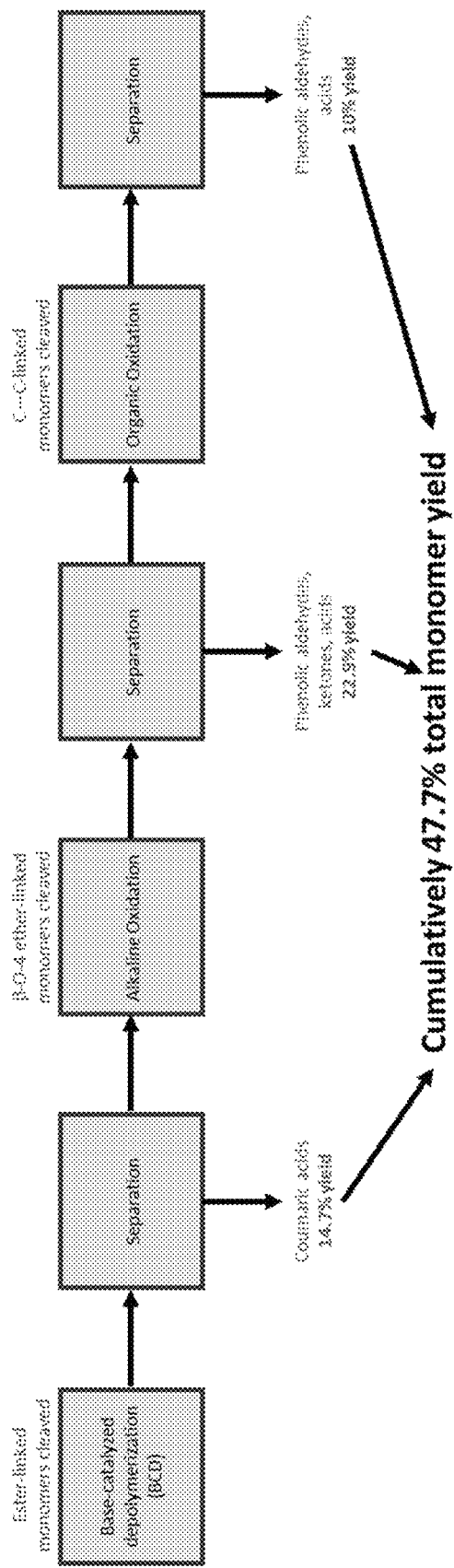
FIG. 5 depicts a scheme for generating maximum monomer yield from lignin. In an embodiment, the cumulative monomer yield is about 47.7%.

In an embodiment, the method disclosed herein uses both the maximum monomer yields from reductive catalytic fractionation (RCF), which has been widely assumed to generate monomers only from ester and β-O-4 ether linkages, and the maximum monomer yields from conventional oxidative degradation. In an embodiment, the oligomeric fraction that would be obtained as a residue from RCF would contain similar linkages. In an embodiment, catalysts are used that are cable of cleaving C—C linkages in lignin dimers and oligomers to generate 10% or more additional monomers. As an example, a 10% yield to additional monomers from the oligomeric reside of the alkaline oxidation process was obtained. Thus, the overall lignin depolymerization process as depicted in FIG. 5, can produce up to about 47.7 wt % total monomers. Notably, this yield does not include the aliphatic acids coproduct, which may also be assimilated by P. putida. While these acids will not likely be converted to muconic acid by the organism, they can contribute to cell mass, leading to a net increase in muconic acid production compared to a case where the only carbon source is monomeric aromatic compounds.

Utilization of Lignin Monomers by P. putida KT2440

P. putida KT2440 was evaluated for growth and substrate utilization in lignin depolymerized by $Sr(OH)_2$ as described above. For comparison purposes, a different lignin liquor originated from alkaline (NaOH) treatment of corn stover was also used. In an embodiment, the liquor was also filtered through 10 kDa and 450 Da and concentrated at different levels. In an embodiment, highly concentrated, low molecular weight lignin fractions were tested to obtain high muconate titers.

Figure 6:
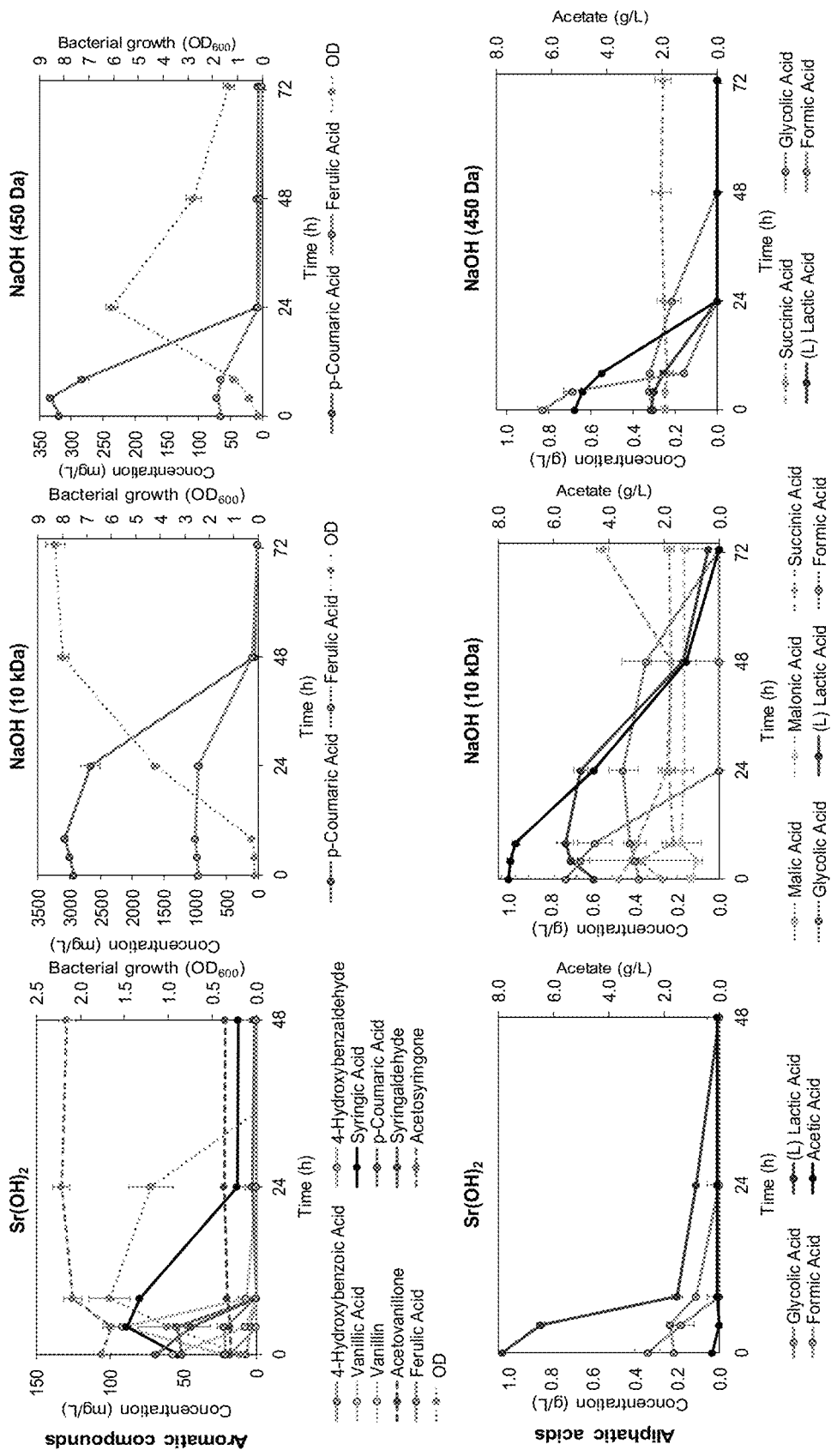
FIG. 6 depicts P. putida KT2440 growth and utilization of aromatic compounds and aliphatic acids from three different lignin streams.

FIG. 6 shows the utilization of monomeric aromatic compounds and aliphatic acids by P. putida KT2440 in the three lignin liquors. Bacterial growth was observed in all the cultivations (showed as an increase in $OD_{600}$). The aromatic compounds generated in the NaOH treatments (mostly p-coumaric acid and ferulic acid) were fully used. $Sr(OH)_2$ depolymerization treatments generated a larger pool of monomers and only two, acetovanillone and acetosyringone, were not used by the bacterium.

Most aliphatic acids were fully used in less than 72 h excluding malic, malonic, and succinic acid in the NaOH liquors. Using methods and organisms disclosed herein, it has been demonstrated that P. putida is able to assimilate most of the small molecules generated from lignin depolymerization processes.

Using methods disclosed herein, both lignin fractions isolated by the DMR-EH process are amenable to depolymerization by a combined BCD-alkaline oxidation scheme. BCD liberates primarily ester-linked monomers in about 15% yield, which are separated prior to oxidation. Alkaline oxidation liberates β-O-4-linked monomers in about a 23% yield, which are also separated prior to an organic oxidation of the remaining oligomeric fraction, which produce about 10% monomer yield. Cumulatively, using the methods disclosed herein, and as depicted in FIG. 5, the methods are capable of generating about 48 wt % monomer yield from lignin. In an embodiment, P. putida is able to assimilate the majority of the aromatic monomers generated in these depolymerization processes.

The foregoing disclosure has been set forth merely to illustrate the invention and is not intended to be limiting.

We claim:

1. A method for the depolymerization of lignin wherein the lignin is treated with alkali $Sr(OH)_2$ wherein the $Sr(OH)_2$ is recovered after treatment of the lignin wherein the recovery of $Sr(OH)_2$ includes a step of cooling an alkaline oxidizing solution of lignin depolymerization products and filtering the $Sr(OH)_2$ from the cooled alkaline oxidizing solution of lignin depolymerization products and further comprises a step of reacting the resulting filtrate with carbon dioxide and then extracting the products of the reaction between the filtrate and carbon dioxide with an organic solvent.

2. The method of claim 1 wherein the depolymerization of lignin yields monomers up to 48% of the weight percent of the lignin.

3. The method of claim 1 further comprising the step of filtering the resulting solution and isolating the strontium carbonate.

4. The method of claim 3 further comprising the step of calcining the strontium carbonate to strontium oxide.

5. The method of claim 4 further comprising the step of reacting the strontium oxide and with water to produce $Sr(OH)_2$.

6. The method of claim 5 further comprising the step of isolating $Sr(OH)_2$.

7. The method of claim 6 wherein the amount of strontium isolated is greater than 90 weight percent of the amount of strontium used in the alkali treatment method for the depolymerization of lignin.

8. A method for the depolymerization of lignin wherein the lignin is treated with alkali $Ba(OH)_2$ wherein the $Ba(OH)_2$ is recovered after treatment of the lignin wherein the recovery of $Ba(OH)_2$ includes the step of cooling an alkaline oxidizing solution of lignin depolymerization products and filtering the $Ba(OH)_2$ from the cooled alkaline oxidizing solution of lignin depolymerization products and further comprises a step of reacting the resulting filtrate with carbon dioxide and then extracting the products of the reaction between the filtrate and carbon dioxide with an organic solvent.

9. The method of claim 8 further comprising the step of filtering the resulting solution and isolating the barium carbonate.

10. The method of claim 9 further comprising the step of calcining the barium carbonate to barium oxide.

11. The method of claim 10 further comprising the step of reacting the barium oxide and with water to produce $Ba(OH)_2$.

12. The method of claim 11 further comprising the step of isolating $Ba(OH)_2$.

* * * * *